July 12, 1949.　　　　　K. TURK　　　　　2,475,651
PRODUCTION OF THERMOPLASTIC INORGANIC COMPOSITIONS
Filed Aug. 13, 1943
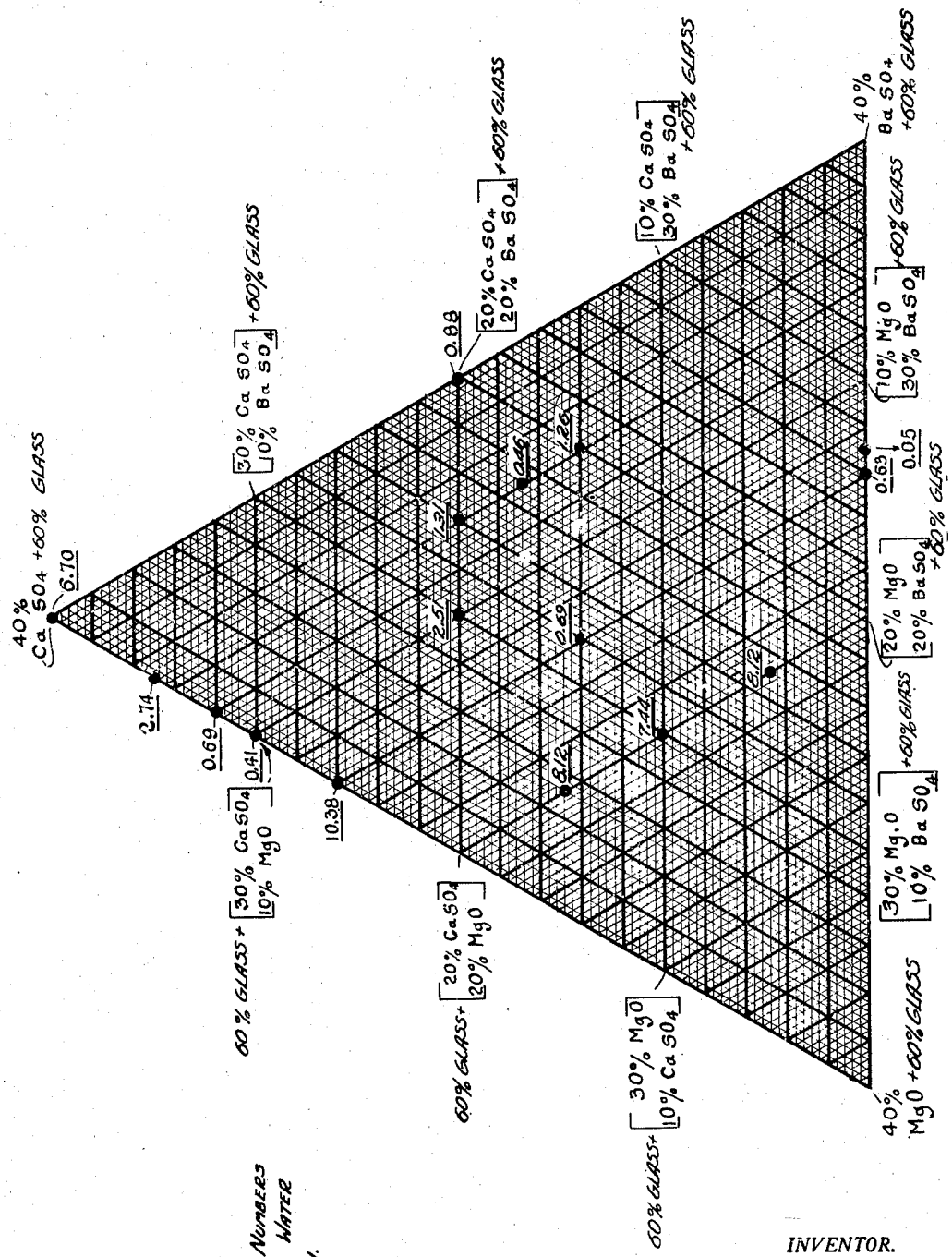
INVENTOR.
KARL TURK,
BY
ATTORNEY Patented July 12, 1949

2,475,651

UNITED STATES PATENT OFFICE 2,475,651

PRODUCTION OF THERMOPLASTIC INORGANIC COMPOSITIONS

Karl Turk, Riderwood, Md.

Application August 13, 1943, Serial No. 498,571

11 Claims. (Cl. 25—156)

The present invention relates to the production of an inorganic thermoplastic composition.

The invention in one of its forms is directed to a pressure consolidated and heat plasticized composition made of a mixture of a base material as, for example, a metal sulfate and a vitreous or glass binding or bonding agent, said thermoplastic composition being capable of taking a fine polish and being worked and machined. Further, the composition is characterized by the following properties: preferably a Moh hardness varying between 3 and 5, although this may be varied considerably; resistance to deformation at fairly high temperatures, and a low water absorption. Preferably, the binding or bonding agent has a softening point varying from about 750° F. to about 1500° F., although these limits may vary considerably and still come within the spirit of the present invention.

The composition of the present invention is, as stated, resistant to deformation at high temperatures, the limit of which is governed by the softening range of the vitreous bonding glass. Preferably, the insoluble sulphate used in producing the herein composition has a fusion temperature higher than about 750° F., and more desirably it is preferred to use an insoluble sulphate as the base or body material which has a fusion temperature higher than 1300° F. In general, the final heat plasticized product will be resistant to temperatures varying from about 1300° F. to about 1800° F., although this limit will be exceeded if the vitreous bonding glass has a softening range higher than 1800° F.

While usually a fairly soft glass having a melting point not greater than 1800° F. is used, it is not desired to be limited to this particular temperature range since, as stated, the resistance to deforation at high temperatures is governed primarily by the softening range of the binding agent. The softening range of the binding agent or glass may be as high as 2400° F., and when the inorganic thermoplastic composition must be exceedingly refractory, the bonding or binding agent may have a softening range as high as 3000° F. In general, the softening range of the bonding agent should allow the plasticization of the final product at the desired working temperature. The glass bonding agent should remain viscous over a sufficient range of temperature to allow the plasticization and working of the material during the pressing operation to be effected without excessive flow of the glassy bonding agent. Preferably, the glassy bonding agent should hold its viscosity through a range of 100° F. of temperature. It is desired to point out that the bonding material should soften at a temperature close to or adjacent to the temperature at which it is desired to produce the material in order to allow the plasticization of the final product at the particular heat treating temperature used whereby the herein produced pressure consolidated product is plasticized.

Illustrative examples of suitable bonding materials are the lead boro-silicates, the sodium boro-silicates, the lead aluminum silicates, the lithium boro-silicates, and the bismuth boro-silicate glasses. It is desired to point out that many variations of these very simple glass compositions may be made, other materials being substituted for part of the lead or the sodium or the lithium, or the bismuth. For example, a suitable vitreous or glassy bonding agent may be provided by introducing into a lead boro-silicate glass oxides of sodium, aluminum, potassium, or calcium. These constituents, together with fluorine may be introduced in proportions suitable to produce a stable glass of satisfactory physical properties which will act as a desirable bonding material. In connection therewith, it may be stated that more or less the composition of the bonding agent is immaterial, provided it softens at the proper temperature, that is around the temperature where the pressure consolidated material is heat-treated to plasticize the same; and the fluidity or viscosity of the bonding agent is such that it holds this fluidity or viscosity over a rather long viscosity range. There are a few glasses which become extremely fluid at the heat pressing temperature, and while such glasses may be used, their use is not desirable since the processing step would require extremely close control. The bonding agent should not react with other ingredients of the thermoplastic composition in such a way as to nullify the refractory characteristics of the insoluble sulphate base, and further, the bonding agent should not react with the insoluble sulphate base in a manner to destroy the plasticity of the final two-step hot pressed plasticized product or of the final one-step heat-treated plasticized product.

For most purposes, it is preferable that the water absorption of the final plasticized product be less than 2%, and desirably less than 1%.

In the preferred form of the invention, the base or body material is any inorganic water insoluble sulphate, or a plurality of inorganic water insoluble sulphates, together with an agent reducing the absorption characteristics of the pressure consolidated and heat treated product, said agent also reducing the brittleness of the plasticized composition. There may be present a plurality of agents acting to reduce the brittleness of the heat plasticized product, or a plurality of agents functioning to reduce the water absorption characteristics of the thermoplastic composition. While any of the water insoluble inorganic sulphates may be used as the dominating constituent of the body material, it is preferred to use calcium sulphate as this imparts a suitable degree of whiteness to the final product, thereby enabling the product to be colored after formation of the composition, or the coloring of the composition may be effected in situ.

As examples of other insoluble sulphates which may be used, mention may be made of the water insoluble alkaline earth salts, including barium sulphate and sulphate of strontium.

It may be stated that the amount of body material and the amount of bonding agent should be adjusted so that the final pressure consolidated and heat-treated product is capable of being worked, that is machined and drilled. The vitreous or glassy bonding agent should be present in such amount as to not confer upon the final product a glassy state, as this prevents the final product from being worked or machined. In general, the vitreous bonding agent for the body material may be present in amounts varying from 30 to 80%, taken on the weight of the mixture, and preferably in amounts varying from 40 to 60%.

While a pressure-consolidated and heat-treated plasticized product made from a water insoluble sulphate, together with a vitreous or glassy bonding agent, may be used for some purposes, it has been ascertained that the composition is brittle to a substantial extent, and further that it has a high moisture absorption coefficient; that is, when the pressure consolidated and heat plasticized composition is boiled for one hour in distilled water and the weight after boiling compared with the original weight, it will be found that the composition has absorbed as much as 3 to 11 or 12% of water, which prohibits the use of the composition for many purposes.

In one form of the invention, there has been introduced into the composition an agent to reduce the brittleness of the heat-treated plasticized material, said agent preferably acting to decrease the water absorption properties of the plasticized composition. Magnesium oxide has been found to give excellent results, in that it materially reduces the brittleness and the water absorption characteristics of the final plasticized product. The water insoluble magnesium silicates, as for example talc, serpentine, and similar and related silicates, may also be used to reduce the brittleness of the heat treated plasticized materials, said magnesium silicates also acting at least to some degree in reducing the brittleness of the heat treated material and also to decrease the water absorption properties of the plasticized composition. However, the results obtained are not as satisfactory as when magnesium oxide is used. In general it may be stated that the water insoluble oxygen-containing magnesium compounds which are inert at the heat treating temperatures herein set forth may be used for the above purpose. This excludes magnesium carbonate, or magnesium sulphate, both of which will generate gases, as for example $CO_2$ and $SO_3$ or $SO_2$.

The amount of magnesium oxide which may be used varies when the body material has present a single sulphate, as for example calcium sulphate; and increasing the magnesium oxide up to 10% while decreasing the calcium sulphate causes a decrease in water absorption of the final product to below 1%. However, if the percentage of magnesium oxide is increased to about 12%, there is a sharp increase of water absorption to about 10 to 12%. Therefore, using a single water insoluble inorganic sulphate typified by calcium sulphate, the critical amount of magnesium oxide by weight appears to be around 10%. However, if an additional inorganic sulphate is present, as for example an alkaline earth water insoluble sulphate, and more particularly barium sulphate, the water absorption properties of the heat-treated plasticized product are reduced to below 1%, when for the calcium sulphate there is substituted an equal amount of barium sulphate. In general, the magnesium oxide may vary between 5 to 15%, and the final heat-treated plasticized product will absorb less than 2% of water, provided there is used in conjunction therewith an additional insoluble sulphate functioning as a secondary water absorption inhibiting agent.

The following is a specific example setting forth the production of the composition of the present invention. The composition of the bonding glass used in the present example is set forth in the following table:

TABLE I

*Composition of typical bonding glass for inorganic thermoplastic compositions maturing between 1200 to 1300° F.*

| Ingredients | Percentage by weight |
|---|---|
| Potash Feldspar | 12 |
| Cryolite | 12 |
| Sodium Carbonate | 10 |
| Boric Acid | 38 |
| Litharge | 19 |
| Barium Carbonate | 7 |

The above ingredients are mixed in a suitable type of mixer, as for example a blade ribbon mixer, and then subjected to smelting in a furnace at a temperature of approximately 1450° F. The smelted batch is allowed to remain in the furnace until the glass is completely molten and substantially free of all raw material. Thereafter, the molten material is discharged into a water bath wherefrom a frit is produced which is then dried. The dried material is then finely divided in any type of mill, as, for example, a ball mill. The fineness of the glass may vary, but preferably it is ground in the ball mill until it shows a residue of 12 grams from a 100 gram sample on a 200 mesh sieve. The vitreous frit or glassy bonding agent is then removed from the ball mill and passed through a screen to remove the coarse particles. The milled screened glass is then charged into a suitable mill as, for example, a ball mill, together with calcium sulphate, magnesium oxide, and barium sulphate, and a suitable amount of water. By way of illustration, and not by way of limitation, the following proportions are set forth:

| | Pounds |
|---|---|
| Glass | 60 |
| Calcium sulphate | 14 |
| Magnesum oxide | 12 |
| Barium sulphate | 14 |

Usually, there is added enough water to facilitate the grinding and mixing in the ball mill and to act as a bonding medium during the cold pressing operation, the amount of this water usually being between 2 and 10% taken on the weight of the above mixture. The charge is treated in the ball mill until it is of a uniform character.

A predetermined weighed amount of the resulting mixed aggregate is then introduced into the mold or die of a hydraulic press and consolidated under a suitable pressure which may vary considerably, but usually varies from 3600 to 4600 pounds per square inch. While this range of consolidating pressure has been found to give satisfactory results, the pressure may be either lowered or increased in accordance with the amount of consolidation desired. For example, if it is desired to form a finished plate 9" x 12" in surface area, and approximately ¼" thick, the material is placed under a pressure of 200 tons total load.

Following the cold pressure-consolidating step, the material is removed from the mold of the press, dried and heat treated at a temperature which will initiate plasticization of the product. The upper limit of the heat-treatment-temperature is determined by the maturing range of the bonding agent. Since the bonding agent in this particular example has a softening range of around 1200 to 1300° F., the pressure-consolidated material is preheated at a temperature varying between 1200 to 1300° F. As stated, this preheating temperature will depend upon the refractoriness of the glass bonding agent. If the glass bonding agent begins to soften at 750° F. or 900° F., or 1100° F., then this is the temperature at which the pressure-consolidated material or blank should be preheated in order to initiate and confer plasticity upon the final product. Using the glass bonding agent set forth in Table I, the material shaped as above set forth may be heat treated for a period of from 20 to 30 minutes. The heat-treated material may then be placed in a heated mold or die as, for example, a hot die hydraulic press, and again subjected to a pressure treatment. For example, the 9" x 12" blank may be subjected to a total dead load of 250 tons, which corresponds to a pressure of approximately 4600 pounds per square inch. During this hot pressing step, the die is maintained at any suitable temperature which will assist in further plasticization of the final pressure-consolidated product or composition. In general, the heat pressing temperature may vary from 750 to 1200° F., that is, the upper limit during the heat pressing may approach the softening range of the vitreous or glassy bonding agent. In some instances, the heat pressure step whereby further plasticity is conferred on the final product or composition may be considerably lower than 750° F. as, for example, 500° F. In general, the heat pressure temperature will vary somewhat in accordance with the plasticity characteristics which it is desired to impart to the final product.

Normally, after the heat pressure step, the material is placed in a rack and cooled to room temperature by normal air circulation. When the final product is to be used for particular purposes, the piece may be placed in a lear or annealing furnace, and brought to room temperature more slowly in order to inhibit stresses and strains in the final product. The resulting product is characterized by all the properties herein set forth; that is, the composition may be subjected to grinding, machining, polishing, and/or drilling operations.

In the above example, pressures, heating cycle, and final heat pressing temperatures may be greatly varied in accordance with the characteristics which it is desired to impart to the final product and still come within the spirit of the present invention.

The following tables illustratively set forth various compositions produced in accordance with the present invention:

TABLE II

*Water absorption characteristics of inorganic thermoplastic compositions maturing at 1300° for 30 minutes and pressure heat-treated as herein set forth, the bonding agent being that shown in Table I, the body base including calcium sulphate, barium sulphate and magnesium oxide.*

| No. | Bonding Glass [1] | Composition in Per Cent by Weight | | | Water Absorption |
|---|---|---|---|---|---|
| | | CaSO₄ | MgO | BaSO₄ | |
| | Per cent | | | | Per cent |
| 1 | 60 | 14 | 12 | 14 | 0.69 |
| 2 | 60 | 17 | 6 | 17 | 0.46 |
| 3 | 40 | 5 | 10 | 45 | 1.03 |
| 4 | 40 | 0 | 10 | 50 | 0.44 |
| 5 | 60 | 14 | 6 | 20 | 1.26 |
| 6 | 60 | 20 | 6 | 14 | 1.31 |
| 7 | 60 | 30 | 10 | 0 | 0.41 |
| 8 | 60 | 31 | 9 | 0 | 0.69 |
| 9 | 57 | 0 | 14 | 29 | 1.22 |
| 10 | 60 | 0 | 12 | 28 | 0.63 |

[1] Glass composition shown in Table I.

TABLE III

*Water absorption characteristics of inorganic thermoplastic compositions maturing at 1300° for 30 minutes and pressure heat-treated as herein set forth, the bonding agent being that shown in Table I, the body base including calcium sulphate only and magnesium oxide.*

| No. | Bonding Glass | Composition in Per Cent by Weight | | Water Absorption |
|---|---|---|---|---|
| | | CaSO₄ | MgO | |
| | Per cent | | | Per cent |
| 11 | 60 | 40 | 0 | 6.70 |
| 12 | 60 | 35 | 5 | 2.74 |
| 13 | 60 | 31 | 9 | 0.69 |
| 14 | 60 | 30 | 10 | 0.41 |
| 15 | 60 | 28 | 12 | 10.38 |

Glass can vary from 30 to 80%

TABLE IV

*Water absorption characteristics of inorganic thermoplastic compositions maturing at 1300° for 30 minutes and pressure heat-treated as herein set forth, the bonding agent being that shown in Table I, the body base including calcium sulphate, barium sulphate and magnesium oxide.*

| No. | Bonding Glass | Composition in Per Cent by Weight | | | Absorption |
|---|---|---|---|---|---|
| | | CaSO₄ | MgO | BaSO₄ | |
| | Per cent | | | | Per cent |
| 16 | 60 | 28 | 12 | 0 | 10.38 |
| 17 | 60 | 14 | 12 | 14 | 0.69 |
| 18 | 60 | 0 | 12 | 28 | 0.63 |
| 19 | 60 | 35 | 5 | 0 | 2.74 |
| 20 | 60 | 14 | 6 | 20 | 1.26 |
| 21 | 60 | 20 | 6 | 14 | 1.31 |

Referring to Table II, it is to be noted that the glass bonding agent varies from 40 to 60%, and the calcium sulphate varies from 0 to 31%; it may range as high as 35 to almost 40%. The magnesium oxide is present in an amount varying from 6 to 14% but may, when used in conjunction with barium sulphate, be present in an amount as much as 25%. The compositions set forth in Table II all are characterized by low water absorption properties. For example, composition No. 1 of Table II which comprises equal amounts of two different water insoluble sulphates, and preferably equal amounts of two different water insoluble alkaline earth sulphates, together with 12% of magnesium oxide, has a water absorption of 0.69%, which represents the difference in weight between the product produced as herein set forth before and after boiling in distilled water for one hour. Composition No. 2, set forth in Table II, sets forth a product in which the inorganic sulphates are present in equal amounts, but the magnesium oxide is only present in an amount equal to 6% taken on the weight of the composition. In Example No. 3, there is present in the composition a plurality of inorganic sulphates and, more specifically, a plurality of alkaline earth inorganic sulphates, but one is present in a very minor proportion and the other is present in an exceedingly high proportion. The bonding agent is present in an amount equal to 40%. Composition No. 4 has only a single inorganic sulphate present with 10% of magnesium oxide; it has very good water absorption characteristics, and, in fact, is slightly lower than any of the other water absorption percentages set forth in Table II. Composition No. 7 has 30% of calcium sulphate present and 10% magnesium oxide, there being no barium sulphate present. Composition No. 10 is a further example of the use of a single inorganic sulphate, together with magnesium oxide as high as 12%, said composition having an exceedingly good water absorption coefficient. This illustrates that with barium sulphate the percentage of magnesium oxide can be considerably higher than with calcium sulphate, and the resulting pressure consolidated and heat plasticized product will still have a low absorption characteristic and be workable and machinable, as herein set forth.

Referring to Table III, it is to be noted that Example No. 11 comprising 60% of bonding glass and 40% of calcium sulphate, had a water coefficient of 6.7%. No magnesium oxide is present in composition No. 11. When 5% of magnesium oxide is substituted for the calcium sulphate, the water absorption characteristics decrease to 2.74%. When the magnesium oxide is increased to 9%, there is a further decrease in absorption to 0.69%. When the magnesium oxide is increased to 10%, there is a further decrease in absorption to 0.41%. However, using calcium sulphate alone, and having present 12% of magnesium oxide, there is a sharp increase of water absorption to 10.38%.

By comparing Examples 10 and 15 of Tables II and III, it will be noted that when 12% of magnesium oxide is present, together with 28% of barium sulphate, the water absorption is 0.63, thereby indicating that more magnesium can be used with barium sulphate than with calcium sulphate.

In Table IV, there has been set forth the effect of additions of barium sulphate in place of calcium sulphate in compositions 15 and 12 of Table III. It is to be noted that composition No. 16 of Table IV is identical with composition No. 15 of Table III. If 14% of barium sulphate be substituted for 14% of calcium sulphate, the moisture absorption coefficient drops from about 10.38 to about 0.69. However, the addition of 14% more has substantially no effect on the water absorption characteristics of the final pressure-consolidated and heat-treated product, this being indicated by the data for composition No. 18. Composition No. 12 of Table III appears as composition No. 19 of Table IV. This composition comprises 60% glass, 35% calcium sulphate, and 5% magnesium oxide, and 0% barium sulphate; and has a water absorption coefficient of 2.74. In composition 21, 14% of the calcium sulphate has been replaced by 14% of barium sulphate, and the water absorption has been reduced to 1.31%. If the barium sulphate contained be further increased to about 20%, as shown in composition 21, the water absorption is still further reduced to 1.26.

In the drawing there is set forth a triaxial diagram showing the effect of various amounts of barium sulphate, calcium sulphate, and magnesium oxide, ranging from 0 to 40% in a thermoplastic composition containing 60% glass. The triaxial diagram is read as follows:

Each of the major divisions—that is the heavy lines—represent a two percent change in the composition. Each of the boundary lines, on the outside of the triangle, represent a two phase diagram consisting of combinations of the two end members of that particular side in an amount totaling 40%, plus 60% glass. For example, the members at the bottom of the figure represent compositions ranging from 0-40% barium sulphate and from 40% to 0% magnesium oxide, plus 60 percent glass and 0 percent calcium sulphate.

The compositions on the left hand leg of the triangle show mixtures containing 60 percent glass with 40 to 0 percent reading down of calcium sulphate and 40 to 0 percent magnesium oxide, reading up. Thus on this leg of the triangle, the composition showing the water absorption of 2.74% at the top of the triaxial has a composition of 35 percent calcium sulphate and 5% magnesium oxide. The next composition, downward, with 0.69% water absorption, contains 8% magnesium oxide and 32 percent calcium sulphate. The next member showing 0.41% moisture absorption contains 30% calcium sulphate and 10% magnesium oxide. To determine the amount of any one constituent, consider the leg of the triangle which does not touch the composition point as 0, then each of the lines parallel to this leg facing in the direction towards the point itself, as an increase of 2% of the material. For example, approximately at the center of the triaxial, there will be found a point showing a water absorption of 2.51 percent. This particular composition has 60% glass, 10% magnesium oxide, 10% barium sulphate and 20% calcium sulphate. Similarly, the point to the right thereof showing 1.31% absorption will be found to contain 60% glass, 20% calcium sulphate, 14% barium sulphate, and 6% of magnesium oxide.

The insoluble sulphates which were used in the preparation of the inorganic thermoplastic composition of the present invention melt at a temperature higher than the softening range of the vitreous bonding glass.

Instead of subjecting the herein described product to a pressure-consolidating step and then to a two-step heat treatment, the mixture of any insoluble sulphate and the bonding agent which is preferably glass, although not necessarily so, and an agent to decrease the water absorption characteristics of the final product may be pressure-consolidated, and heated to plasticize the consolidated product. Thereafter the consolidated and heat-treated plasticized product is preferably allowed to slowly cool to thereby inhibit or prevent the generation of strain producing forces. The temperatures and pressures used when manufacturing utilizing a one-step heating process may be the same as herein set forth for either of the heating steps using the two-step heating method.

The invention herein set forth may be utilized to produce earthenware, that is a product which is technically known as earthenware, the latter being capable of taking any of the prior art glazes which are now used to glaze earthenware, said glazes being preferably prior art ceramic glazes. However, the earthenware product which may be made in accordance with the present invention differs from the prior art ceramic ware in that the ceramic earthenware of the present invention can be machined and worked after forming and firing, whereas ceramic ware produced in accordance with the hitherto known processes after once having been given a firing treatment is difficult to work, shape or form. It is desired to point out that the time required to produce the prior art ceramic ware is a matter of days, whereas the herein described product may be prepared in a relatively short time, as for example in from two to ten hours. The herein described inorganic thermoplastic composition may also be used for electrical insulating purposes. However, it is not as suitable for high frequency insulation as the glass-bonded mica type material. The present product may be colored and used for decorative panels when some electrical insulation value is desired.

What I claim is:

1. A pressure-consolidated and heat-plasticized thermoplastic drillable and machinable product having a low water absorption coefficient consisting of a mixture of about 30% to 80% of a metal borosilicate glass bonding agent having a softening range between about 750° F. and about 1500° F., 5% to 15% of magnesium oxide having the property of reducing the water-absorption characteristics of the thermoplastic product, and the balance of the mixture being an insoluble sulphate selected from the group consisting of barium, calcium and strontium sulphates and mixtures thereof, each of said sulphates having a melting point higher than the softening range of the bonding glass.

2. A pressure-consolidated and heat-plasticized thermoplastic drillable and machinable product having a low water absorption coefficient consisting of a mixture of about 40% to 60% of a metal borosilicate glass bonding agent having a softening range between about 750° F. and about 1500° F., 5% to 15% of magnesium oxide having the property of reducing the water-absorption characteristics of the thermoplastic product, and the balance of the mixture being an insoluble sulphate selected from the group consisting of barium, calcium and strontium sulphates and mixtures thereof, each of said sulphates having a melting point higher than the softening range of the bonding glass.

3. A pressure-consolidated and heat-plasticized thermoplastic drillable and machinable product having a low water absorption coefficient consisting of a mixture of about 30% to 80% of a metal borosilicate glass bonding agent having a softening range between about 750° F. and about 1500° F., 5% to 15% of magnesium oxide having the property of reducing the water-absorption characteristics of the thermoplastic product, and the balance of the mixture being calcium sulphate and barium sulphate, each sulphate having a melting point higher than the softening range of the bonding glass.

4. A pressure-consolidated and heat-plasticized thermoplastic drillable and machinable product having a low water absorption coefficient consisting of a mixture of about 40% to 60% of a metal borosilicate glass bonding agent having a softening range between about 750° F. and about 1500° F., 5% to 15% of magnesium oxide having the property of reducing the water-absorption characteristics of the thermoplastic product, and the balance of the mixture being calcium sulphate and barium sulphate, each sulphate having a melting point higher than the softening range of the bonding glass.

5. A pressure-consolidated and heat-plasticized thermoplastic drillable and machinable product having a low water absorption coefficient consisting of a mixture of 30% to 80% of a metal borosilicate glass having a softening range between about 750° and 1500° F., 5% to 10% magnesium oxide having the property of reducing the water absorption characteristics of the thermoplastic compound, and the balance of the mixture being calcium sulphate, the latter having a melting point higher than the softening range of the bonding glass.

6. A pressure-consolidated and heat-plasticized thermoplastic drillable and machinable product having a low water absorption coefficient consisting of a mixture of 30% to 80% of a metal borosilicate glass having a softening range between about 750° and 1500° F., 5% to 15% magnesium oxide having the property of reducing the water absorption characteristics of the thermoplastic compound, and the balance of the mixture being barium sulphate, the latter having a melting point higher than the softening range of the bonding glass.

7. The method of producing an inorganic thermoplastic machinable material comprising forming a mixture containing a small amount of a liquid for plasticizing the mixture, about 30% to about 80% of a finely divided metal borosilicate bonding agent having a softening range between about 750° and about 1500° F., about 5% to about 15% magnesium oxide having the property of reducing brittleness and water-absorption characteristics of the thermoplastic product, and a substantially water-insoluble inorganic alkaline metal sulphate having a melting point higher than the softening range of the bonding agent and constituting substantially all of the balance of the solids of the mixture, said sulphate being selected from the group consisting of barium, calcium and strontium sulphates, consolidating the mixture and heat-treating and plasticizing the mixture under a pressure varying between 3600 and 4600 pounds per square inch and at a temperature within the softening range of the silicate bonding agent while inhibiting the production of a glassy texture preventing machining of the final product.

8. The method of producing an inorganic thermoplastic machinable material comprising forming a mixture containing a small amount of a liquid for plasticizing the mixture, about 30% to about 80% of a finely divided metal borosilicate bonding agent having a softening range between 750° and 1500° F., about 5% to about 15% magnesium oxide having the property of reducing brittleness and the water-absorption characteristics of the thermoplastic product, and a substantially water-insoluble alkaline earth metal sulphate having a melting point higher than the softening range of the bonding agent and constituting substantially all of the balance of the solids of the mixture, said sulphate being selected from the group consisting of barium, calcium and strontium sulphates, and consolidating and heat-treating and plasticizing the mixture under pressure at a temperature within the softening range of the silicate bonding agent while inhibiting the production of a glassy texture preventing machining of the final product.

9. The method of producing an inorganic thermoplastic machinable material comprising forming a mixture containing a small amount of a liquid for plasticizing the mixture, about 30% to 80% of a metal borosilicate bonding agent having a softening range between about 750° and about 1500° F., about 5% to 10% magnesium oxide having the property of reducing brittleness and water-absorption characteristics of the thermoplastic product, and water-insoluble calcium sulphate having a melting point higher than the softening range of the bonding agent, the calcium sulphate constituting substantially all of the balance of the solids of the mixture, consolidating and heat-treating and plasticizing the mixture under pressure at a temperature within the softening range of the silicate bonding agent while inhibiting the production of a glassy texture preventing machining of the final product.

10. The method of producing an inorganic thermoplastic machinable material comprising forming a mixture containing a small amount of a liquid for plasticizing the mixture, about 40% to about 60% of a metal borosilicate bonding agent having a softening range between about 750° and about 1500° F., about 5% to 15% of magnesium oxide having the property of reducing brittleness and the water-absorption characteristics of the thermoplastic product, and a substantially water-insoluble alkaline earth metal sulphate having a melting point higher than that of the bonding agent and constituting substantially all of the balance of the solids of the mixture, said sulphate being selected from the group consisting of barium, calcium and strontium sulphates, and consolidating and heat-treating and plasticizing the mixture under a pressure of about 3600 to 4600 pounds per square inch and at a temperature within the softening range of the borosilicate bonding agent while inhibiting the production of a glassy texture preventing machining of the final product.

11. The method of producing an inorganic thermoplastic machinable material comprising forming a mixture containing a small amount of a liquid for plasticizing the mixture, a metal borosilicate bonding agent having a softening range between about 750° and 1500° F., a substantially water-insoluble alkaline earth metal sulphate having a melting point higher than the softening range of the bonding agent, said sulphate being selected from the group consisting of barium, calcium and strontium sulphates, and about 5% to 15% magnesium oxide having the property of reducing the brittleness and water-absorption characteristics of the thermoplastic product, the bonding agent and the alkaline earth sulphate together constituting substantially all of the balance of the solids of the mixture, the bonding agent being present in a predominating quantity as compared with the alkaline earth metal sulphate, consolidating the mixture under pressure, preheating the pressure-consolidated product at a temperature between about 750° and about 1500° F., and subjecting the pre-heated, consolidated product to a final pressure treatment at a temperature between about 750° and within the softening range of the silicate bonding agent to further plasticize the product while inhibiting the production of a glassy texture preventing machining of the final product.

KARL TURK.

REFERENCES CITED

The following references are of record in the file of this patent:

UNITED STATES PATENTS

| Number | Name | Date |
|---|---|---|
| 4,242 | Farnam | Oct. 25, 1845 |
| 751,080 | Kruger | Feb. 2, 1904 |
| 901,599 | Eisenlohr | Oct. 20, 1908 |
| 1,049,005 | Steinmetz | Dec. 31, 1912 |
| 1,495,138 | Downes | May 20, 1924 |
| 1,894,400 | Herbsman | Jan. 17, 1933 |
| 2,001,664 | Foster | May 14, 1935 |
| 2,032,239 | Wedlock | Feb. 25, 1936 |
| 2,073,136 | Bennett | Mar. 9, 1937 |
| 2,159,349 | Bennett | May 23, 1939 |
| 2,213,495 | Hagar | Sept. 3, 1940 |
| 2,390,354 | Clapp | Dec. 4, 1945 |

FOREIGN PATENTS

| Number | Country | Date |
|---|---|---|
| 1,890 | Great Britain | 1881 |
| 4,539 | Great Britain | 1897 |
| 3,483 | Great Britain | 1903 |
| 152,780 | Great Britain | 1920 |
| 72,475 | Germany | 1893 |
| 95,084 | Germany | 1897 |